United States Patent [19]

Flinn et al.

[11] Patent Number: 5,467,285
[45] Date of Patent: Nov. 14, 1995

[54] METHOD AND SYSTEM FOR OPTIMIZING MATERIAL MOVEMENT WITHIN A COMPUTER BASED MANUFACTURING SYSTEM

[75] Inventors: Donald R. Flinn, Roswell; John F. Laszcz, Marietta, both of Ga.; David H. Withers, Dayton, Ohio

[73] Assignee: International Business Machines Corporation, Armonk, N.Y.

[21] Appl. No.: 299,171

[22] Filed: Aug. 30, 1994

Related U.S. Application Data

[63] Continuation of Ser. No. 802,997, Dec. 5, 1991, abandoned.

[51] Int. Cl.⁶ ............................................. G06F 17/00
[52] U.S. Cl. ..................... 364/478; 364/403; 364/468
[58] Field of Search ............................ 364/401, 402, 364/403, 408, 148, 468, 478, 479, 188; 395/159

[56] References Cited

U.S. PATENT DOCUMENTS

| | | | |
|---|---|---|---|
| 4,472,783 | 10/1984 | Johnstone et al. | 364/474 |
| 4,561,060 | 12/1985 | Hemond | 364/478 |
| 4,648,023 | 3/1987 | Powell | 364/156 |
| 4,669,047 | 5/1987 | Chucta | 364/468 |
| 4,807,108 | 2/1989 | Ben-Arieh et al. | 364/148 |
| 4,958,292 | 9/1990 | Kaneko et al. | 364/403 X |
| 5,031,223 | 7/1991 | Rosenbaum et al. | 364/478 X |
| 5,038,283 | 8/1991 | Caveney | 364/478 X |
| 5,060,165 | 10/1991 | Schumacher et al. | 364/478 |
| 5,063,506 | 11/1991 | Brockwell et al. | 364/401 X |
| 5,068,797 | 11/1991 | Sansone et al. | 364/478 |
| 5,072,401 | 12/1991 | Sansone et al. | 364/478 |
| 5,134,560 | 7/1992 | Ferriter et al. | 364/468 X |

*Primary Examiner*—Roy N. Envall, Jr.
*Assistant Examiner*—Brian C. Oakes
*Attorney, Agent, or Firm*—Andrew J. Dillon

[57] ABSTRACT

A method and system for determining an optimal material movement product path within a computer based manufacturing system is disclosed. A transport matrix is created having multiple rows and columns, each associated with a workstation within a computer based manufacturing system. At each cell within the matrix located at an intersection of a selected row and column, the attributes for all possible methods of transport between the associated workstations are listed. Preferably transport attributes, such as transport type, velocity/distance, travel time, capacity, authorization required, fragility, cost and current status of the transport system are listed within the cell and may thereafter be dynamically updated. After identifying a selected product path an analysis of the transport matrix may be utilized to determine an optimal route based upon user inputs, such as the most rapid, least expensive, or most reliable form of transport, for transporting material between selected workstations.

7 Claims, 4 Drawing Sheets

METHOD AND SYSTEM FOR OPTIMIZING MATERIAL MOVEMENT WITHIN A COMPUTER BASED MANUFACTURING SYSTEM

This is a continuation of application Ser. No. 07/802,997, filed 5, Dec. 19991, abandoned.

BACKGROUND OF THE INVENTION

1. Technical Field

The present invention relates in general to improvements in computer based manufacturing systems and in particular to improvements in determining optimal routes for moving materials between workstations in a computer based manufacturing system. Still more particularly, the present invention relates to a method and system for automatically determining an optimal route among many available routes for transporting materials between workstations within a computer based manufacturing system.

2. Description of the Related Art

Computer based manufacturing systems are well known in the art. The process of designing, developing and manufacturing a new product, or making major changes to existing products, presents many challenges to product managers and manufacturing managers. It is important to maintain product quality while bringing a product to market for the least cost, within a set schedule. In today's highly competitive industries, product managers and manufacturing managers require information to address many problems which arise because of the complexity of new products and the complexity of world-wide production and the changing nature of competition. A requirement that products be manufactured for the least possible cost is an important requirement in all industries.

Many texts have been written concerning the field of production management. For example, Joseph Orlicky wrote *Material Requirement Planning*, published by McGraw-Hill, which has become the industry standard reference for almost all job shop planning requirements. This concept of planning and releasing work to the manufacturing shop floor is well accepted and, even today, many vendors are selling software based upon this concept. From a dispatching point of view, this system takes into account only the general concept of a first-in, first-out (FIFO) basis of dispatching. Dr. D. T. Phillips and G. L. Hogg published a paper entitled *A State-of-the-Art Survey of Dispatching Rules for Manufacturing Shop Operations*, International Journal of Production Research, Volume 20, No. 1, pages 27–45, which provides varying dispatching rules which may be utilized in a planning process.

International Business Machines Corporation has developed a product called "Capacity Planning and Operation Sequencing System (CAPOSS)", described in Education Guide No. SR19-5004-0, published by International Business Machines Corporation, which provides static dispatching functions in the form of deciding the next operation to be performed for an order after completion of a prior operation.

One important feature in modern day manufacturing facilities is the need for an improved parts and materials supply system which is necessary to minimize inventory and floor space required for parts storage at the workstations. The efficiency and economy of so-called "just in time" inventory control systems is now well recognized and many systems have been implemented which attempt to impose such a delivery system. For example, U.S. Pat. No. 4,669,047 discloses an automated parts supply system which may be utilized to implement a "just-in-time" supply system.

U.S. Pat. No. 4,472,783 describes an improved flexible manufacturing system which utilizes multiple numerically controlled machine tools. In accordance with a supervisory control computer the system described therein supplies routing information to the material handling system controller which in response, controls the movement of pallets through a manufacturing production path to various machine tools. This system deals with a novel method of controlling a specific type of manufacturing line.

Similarly, U.S. Pat. No. 4,561,060 describes a system for controlling the flow of articles within a work area which includes multiple workstations and for acquiring real time information relating to the status of the work in progress.

None of the above described methods disclose a means for determining the best method, among available alternatives, for transporting materials and product between work centers, while considering various factors such as fragility, size or weight. Modern systems have become so complex that it is not uncommon for multiple modes of material movement to be available for transferring product between locations within and among manufacturing work centers and the availability of such multiple modes of transportation has substantially increased the complexity of the tasks of determining an optimal path for product to be transported within a computer based manufacturing system. Further, a manufacturing process may be distributed over a wide geographic area, requiring a much more sophisticated level of control for transport of product throughout the process. It is therefore obvious that a need exists for a method and system which may be utilized to optimize the movement of material within a manufacturing process within a dynamic, changing environment.

SUMMARY OF THE INVENTION

It is therefore one object of the present invention to provide an improved computer based manufacturing system.

It is another object of the present invention to provide a method and system for determining optimal routes for moving materials between workstations within a computer based manufacturing system.

It is yet another object of the present invention to provide an improved method and system for determining an optimal route among many available routes for transporting material between workstations within a computer based manufacturing system which is suitable for automatic processing.

The foregoing objects are achieved as is now described. A method and system for determining an optimal material movement product path within a computer based manufacturing system is disclosed. A transport matrix is created having multiple rows and columns, each associated with a workstation within a computer based manufacturing system. At each cell within the matrix located at an intersection of a selected row and column, the attributes for all possible methods of transport between the associated workstations are listed. Preferably transport attributes, such as transport type, velocity/distance, travel time, capacity, authorization required, fragility, cost and current status of the transport system are listed within the cell and may thereafter be dynamically updated. After identifying a selected product path an analysis of the transport matrix may be utilized to determine an optimal route based upon user inputs, such as the most rapid, least expensive, or most reliable form of transport, for transporting material between selected workstations.

BRIEF DESCRIPTION OF THE DRAWING

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
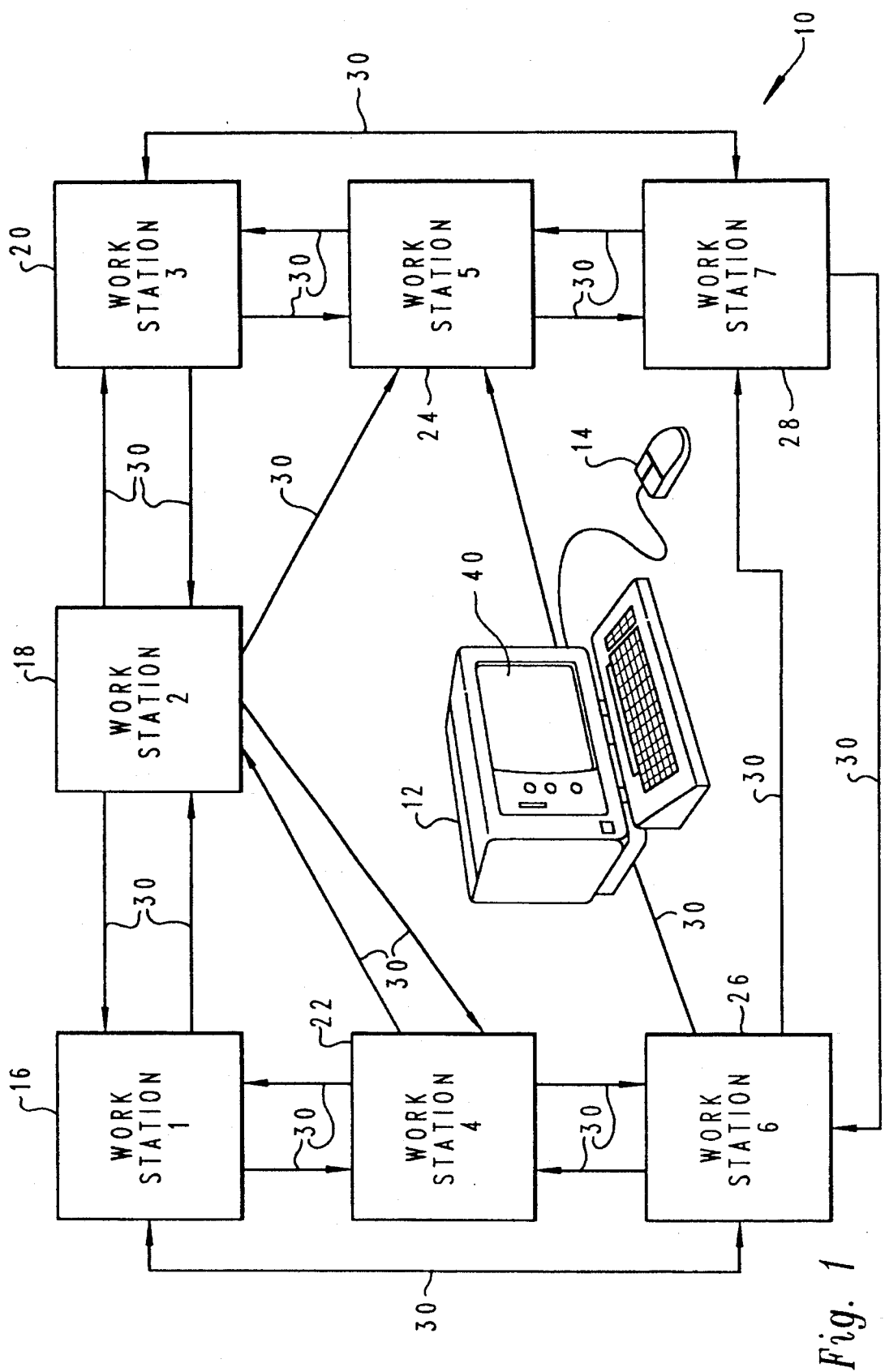
FIG. 1 is a schematic view of a plurality of workstations within a computer based manufacturing system.

With reference now to the figures and in particular with reference to FIG. 1, there is depicted a schematic view of a plurality of workstations within a computer based manufacturing system 10. As illustrated, computer based manufacturing system 10 includes a plurality of workstations 16, 18, 20, 22, 24, 26 and 28. As those skilled in the art will appreciate, each workstation depicted represents a location wherein an operation upon material will occur or materials may be stored during the manufacturing process. Of course, each workstation may represent a location within a different country, multiple locations within a single country, multiple locations among buildings at a single manufacturing site or multiple locations among work cells or work areas within a single building. Connecting each of the workstations depicted are various transport methods 30 which are depicted schematically utilizing arrows connecting individual workstations.

Transport methods 30 represented schematically within FIG. 1 may represent multiple types of transport such as a conveyor belt systems, carts, trucking routes, air transport routes, or other various types of transportation. Additionally, those skilled in the art will appreciate that while a single transport method 30 may be depicted within FIG. 1 for connecting a selected workstation to a second selected workstation in reality multiple methods of transport may be available to relocate a product from one workstation to a second workstation.

Also depicted within FIG. 1 is a computer 12. Computer 12 is preferably utilized to schedule and control operations within the computer based manufacturing system depicted and, may be implemented utilizing any suitable computer, such as the International Business Machines Corporation AS/400. A display screen 40 is depicted within computer 12 and may be utilized, in accordance with the method and system of the present invention, to display and depict a transport matrix which may be created in accordance with the teachings contained herein. Additionally, a graphical pointing device 14 is associated with computer 12 in a manner well known to those skilled in the computer art and may be utilized, as will be explained in greater detail herein, to manipulate data within a transport matrix.

Figure 2:
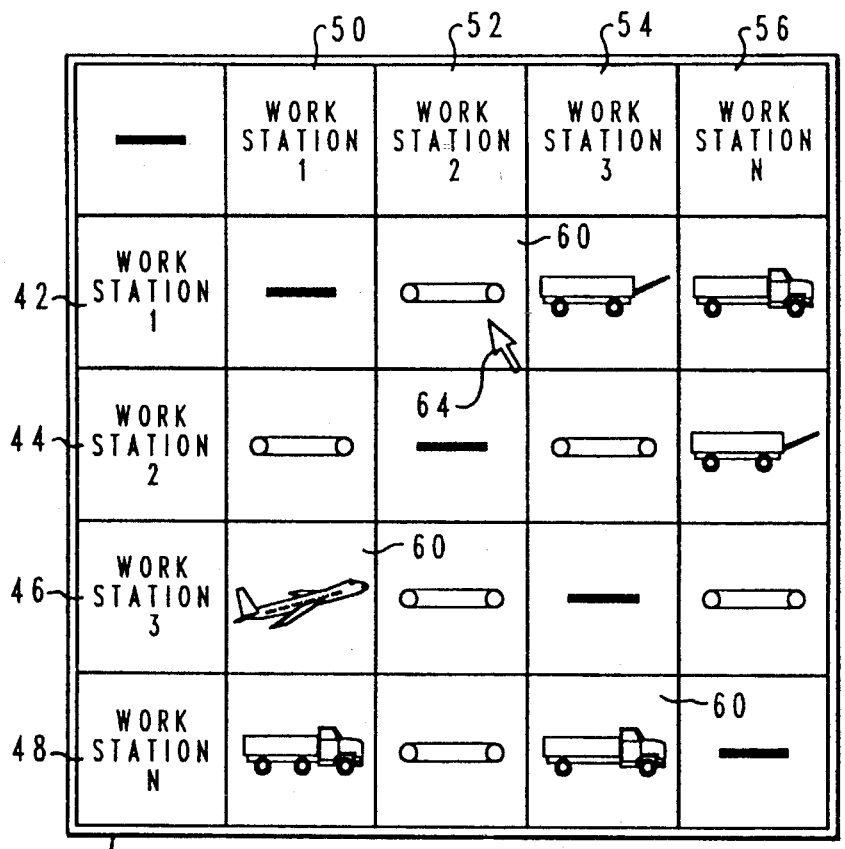
FIG. 2 is a pictorial representation of a computer display screen depicting a transport matrix created in accordance with the method and system of the present invention.

Referring now to FIG. 2, there is depicted a pictorial representation of a computer display screen illustrating a transport matrix 40, which is created in accordance with the method and system of the present invention. As is illustrated, transport matrix 40 includes a plurality of rows and columns, each of which is associated with a selected workstation within computer based manufacturing system 10 (see FIG. 1). Thus, row 42 is associated with workstation 1, row 44 is associated with workstation 2, row 46 is associated with workstation 3 and row 48 is associated with workstation N. Similarly, each column within transport matrix 40 is also associated with a workstation within computer based manufacturing system 10. That is, columns 50, 52, 54, and 56 are associated respectively with workstations 1, 2, 3 and N.

Of course, those skilled in the art will appreciate that transport matrix 40 may be created in whatever size is necessary to accommodate each workstation within computer based manufacturing system 10. Thereafter, in accordance with an important feature of the present invention, each cell within transport matrix 40 has associated therewith a listing of methods of transport and associated attributes for those methods of transport which are available to transport material from a workstation associated with a particular row to a workstation associated with a particular column. Of course, since transport between a workstation and itself will not be necessary, the diagonal of transport matrix 40 will be left blank, or may be utilized for local movement within a workstation, e.g. input/output buffers.

In the depicted embodiment of FIG. 2, a graphic illustration of each type of transport is illustrated. That is, a graphic depiction of a conveyor belt, transport cart, truck or airplane may be utilized to indicate the method of transport which is available to transport material from one workstation to another workstation, as illustrated at various cells 60 within transport matrix 40. Additionally, in the event multiple methods of transport exist for transporting material from a particular workstation to a second workstation, transport matrix 40 may be three-dimensional in nature or, alternatively, a graphic indication of alternate methods of transport may be included within each cell 60, in a manner which will be explained in greater detail herein. Also depicted within FIG. 2 is mouse pointer 64, which may be utilized in the so-called "point and click" method to select a particular method of transport and thereafter display the attributes associated with that method of transport, in a manner which will be depicted in greater detail below.

Figure 3:
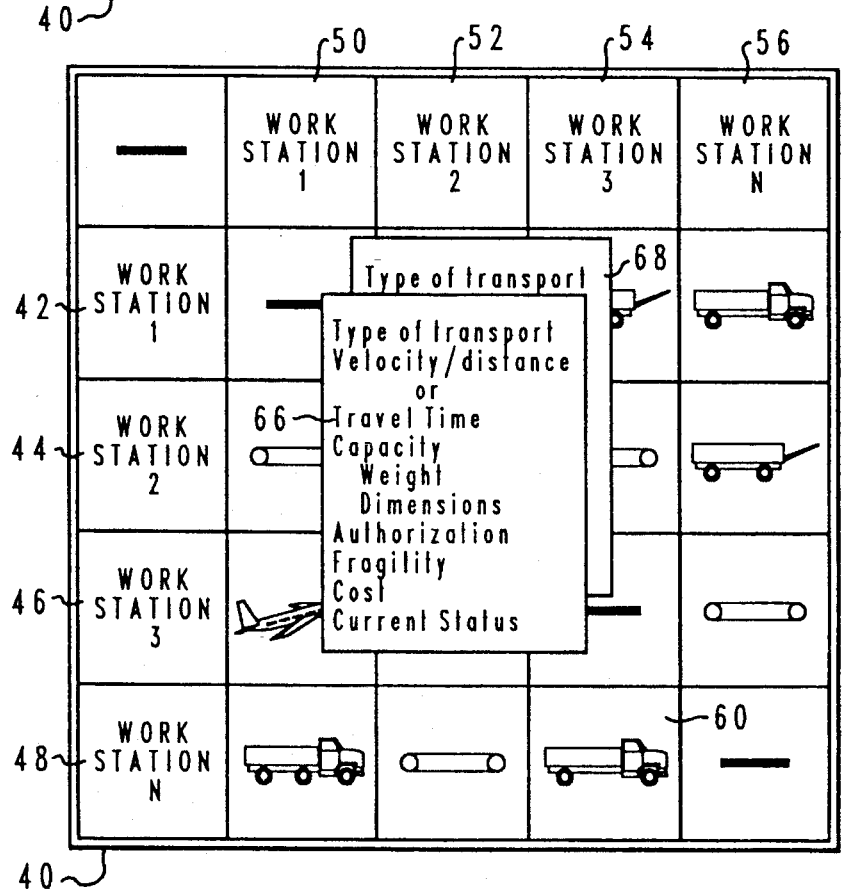
FIG. 3 is a pictorial representation of the computer display screen of FIG. 2 including an additional display of transport attributes.

With reference now to FIG. 3, there is depicted a pictorial representation of the computer display screen of FIG. 2, including an additional display of transport attributes. As illustrated, transport matrix 40 of FIG. 2 is depicted and a particular cell 60 at the intersection of row 42 and column 52, has been selected, preferably utilizing a graphical selecting device, such as mouse pointer 64. In response to such selection a transport attribute viewport 66 is displayed which includes a plurality of attributes associated with the particular method of transport depicted within cell 60. In the depicted embodiment of the present invention, attributes such as the type of transport, velocity/distance or travel time, capacity, authorization required, fragility, cost and current status of the type of transport are displayed. Additionally, a second transport attribute viewport 68 may be displayed in an overlapped manner, such as that depicted within FIG. 3, indicating the existence of an alternate method of transport between workstation 1 and workstation 2.

Figure 4:
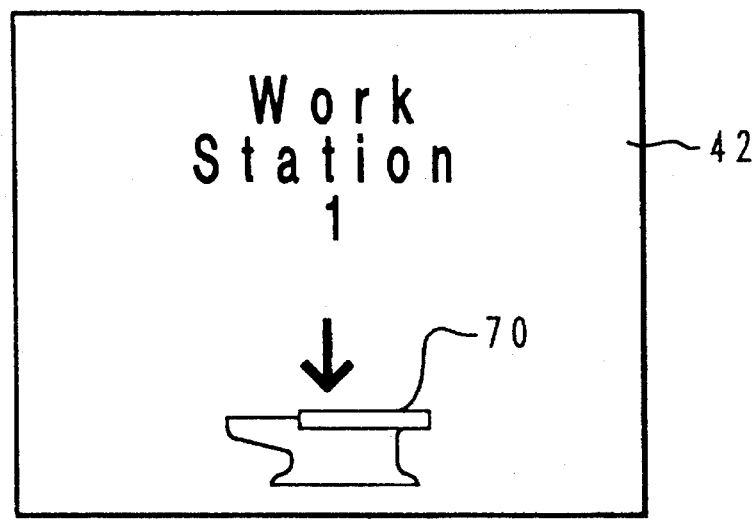
FIG. 4 is an enlarged pictorial representation of one embodiment of a workstation row or column within the transport matrix of FIG. 2.

Referring now to FIG. 4, there is depicted an enlarged pictorial representation of one embodiment of a workstation row or column within the computer display screen of FIG. 2. As illustrated, in this depicted embodiment of the present invention, row 42 which is associated with workstation 1, includes a graphic illustration 70 which may be utilized to depict in iconic form an identification of the type and/or purpose of workstation 1. Iconic representation 70 is preferably utilized to indicate that workstation 1 is a stamping workstation wherein material may be modified utilizing a stamping or die cutting type machine.

Figure 5:
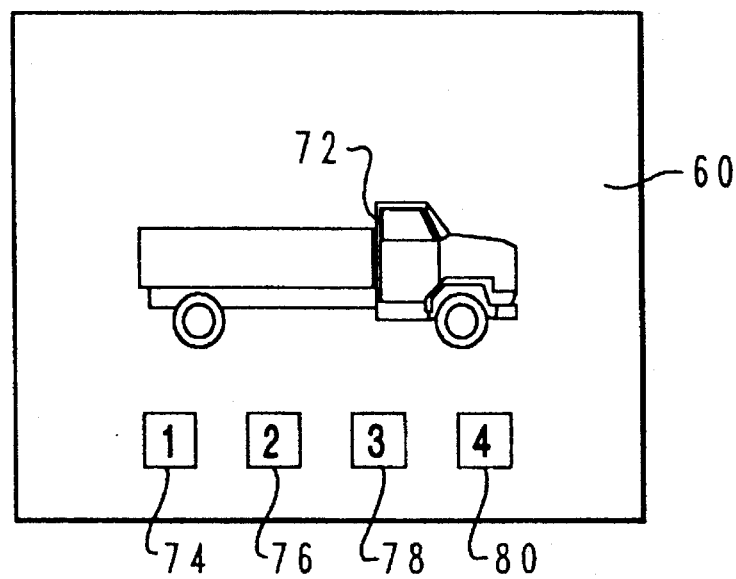
FIG. 5 is an enlarged pictorial representation of one embodiment of a transport method cell within the transport matrix of FIG. 2.

With reference now to FIG. 5, there is depicted a transport method cell 60 within the computer display screen of FIG. 2, which includes an iconic representation 72 which may be utilized to identify the method of transport which is illustrated within cell 60. Iconic representation 72 depicts a truck, indicating that transport of material from the workstation associated with the associated row to the workstation associated with the column associated with cell 60 is by truck transport. Additionally, alternate transport selection blocks 74, 76, 78 and 80 may be utilized to graphically indicate the presence of additional methods of transport between the workstations associated with this cell.

Figure 6:
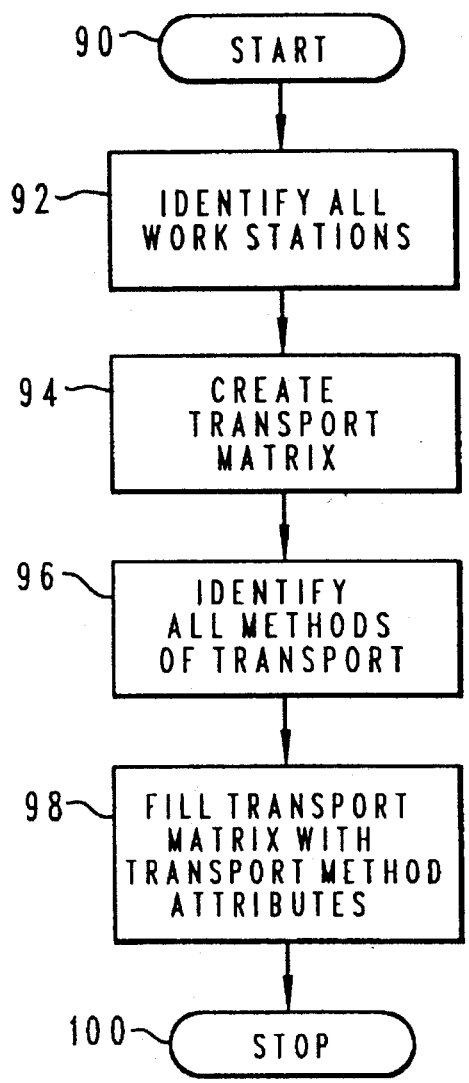
FIG. 6 is a high level flowchart depicting the creation of the transport matrix of FIG. 2.

Referring now to FIG. 6, there is depicted a high level flowchart depicting the creation of transport matrix 40 of FIG. 2. As illustrated, the process begins at block 90 and thereafter passes to block 92 which depicts an identification of all workstations within a selected computer based manufacturing system. Next, the process passes to block 94 which depicts the creation of a transport matrix in the manner depicted within FIG. 2.

Thereafter, all available methods of transport between the various workstations located within the transport matrix are identified, as illustrated in block 96, and block 98 then depicts the filling of the cells within the transport matrix with transport method attributes. Thereafter, the process terminates, as illustrated at block 100.

Figure 7:
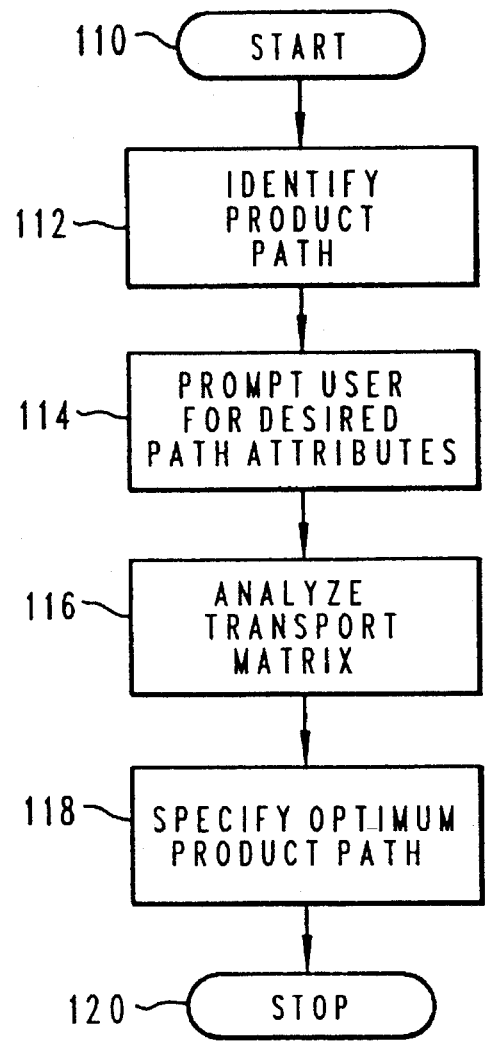
FIG. 7 is a high level flowchart depicting an analysis of an optimum product path utilizing the transport matrix of FIG. 2.

Finally, with reference to FIG. 7, there is depicted a high level flowchart depicting an analysis of an optimum product path utilizing the transport matrix of FIG. 2. As above, the process begins at block 110 and thereafter passes to block 112, which illustrates the identification of a desired product path. Those skilled in the computer based manufacturing arts will appreciate that scheduling of a particular product path may be accomplished by identifying those workstations which must necessarily operate upon a material to create the desired product. Additionally, multiple methods of transport may exist for moving material from each workstation within the desired product path to a subsequent workstation. Therefore, block 114 illustrates the prompting of a user for desired path attributes. These attributes may be selected by a user in order to minimize or maximize any objective function. For example, the fastest available method may be selected. Alternately, the least expensive method or shortest route may be selected by the user for a desired path attribute. Similarly, the desired path attributes may be arbitrarily complex. For example, a user may require the optimum path to be specified as that route which is least expensive which; however, has a ninety percent probability of completion within a specified period of time. Similarly, a user may specify a path which will complete production at the earliest possible moment including considerations of availability, reliability, and speed. Of course, those skilled in the art will appreciate that the term "user" as utilized herein, may mean a dispatch or shipping program, in addition to an actual human operator of the system. In situations wherein the "user" is a shipping program or the like, the method and system and system of the present invention may be processed automatically.

After prompting the user for the desired path attributes for an identified product path block 116 depicts the analysis of the transport matrix, which was created within FIG. 6. This may be accomplished utilizing any well known matrix/path analysis technique. Block 118 then illustrates the specification of the optimum product path complying with the user's desired path attributes and the process then terminates, as depicted at block 120.

Upon reference to the foregoing those skilled in the art will appreciate that the Applicants herein have provided a method and system for describing alternate modes of material movement between locations within a computer based manufacturing system and for the efficient utilization of this information in creating an optimum routing for material within that system. The information regarding alternate modes of material movement, as well as particular information relating to each of these alternate modes may be dynamically updated to compensate for variations in the transport modes available while still providing an optimized route for material movement within the system.

While the invention has been particularly shown and described with reference to a preferred embodiment, it will be understood by those skilled in the art that various changes in form and detail may be made therein without departing from the spirit and scope of the invention.

We claim:

1. A computer based system for controlling the movement of at least one material along an identified product path within a manufacturing process, said computer based system including a display device and a user input device, said computer based system comprising:

a plurality of workstations within said manufacturing process for operating upon said at least one material;

a plurality of means for transporting said at least one material between selected ones of said plurality of workstations wherein at least two diverse means exist for transporting said at least one material between a specified two of said plurality of workstations;

a transport matrix displayed within said display device, said transport matrix having a plurality of cells each located at an intersection of one of a plurality of rows and columns, each row and column having associated therewith an identification of one of said plurality of workstations, each cell including a graphic representation displayed therein of a means for transporting said at least one material;

a plurality of dynamically alterable parameters associated with each cell, said plurality of dynamically alterable parameters including an elapsed time required and a cost associated with each of said means for transporting said at least one material; and processor means for analyzing said displayed transport matrix for identifying an optimum route for transporting at least one material between selected ones of said plurality of workstations in response to an identified product path and at least one desired path attribute specified by a user of said system utilizing said user input device.

2. The computer based system for controlling the movement of at least one material along an identified path within a manufacturing process according to claim 1, wherein said at least one desired path attribute comprises minimal cost and wherein said processor means for identifying an optimum route for transporting said at least one material between selected ones of said plurality of workstations comprises means for identifying a least costly route.

3. The computer based system for controlling the movement of at least one material along an identified path within a manufacturing process according to claim 1, wherein said processor means for identifying an optimum route for transportation said at least one material between selected ones of said plurality of workstations comprises means for identifying a least time consuming route.

4. A method in a computer based manufacturing system for controlling the transport of at least one material along a product path between selected ones of a plurality of workstations which operate upon said material, said computer based manufacturing system including a display device and a user input device, said method comprising the steps of:

creating a transport matrix having a plurality of rows and columns;

associating an identification of a selected one of said plurality of workstations with each of said plurality of rows and with each of said plurality of columns within said transport matrix;

displaying said transport matrix within said display device;

associating selected attributes for each of multiple available methods of transport from a first of said plurality of workstations to a second of said plurality of workstations within a cell within said transport matrix displayed at an intersection between a row associated with said first of said plurality of workstations and a column associated with said second of said plurality of workstations;

displaying a graphic representation of at least one of said available methods of transport within said cell within said transport matrix displayed at an intersection between a row associated with said first of said plurality of workstations and a column associated with said second of said plurality of workstations;

prompting a user to input a desired path attribute for an identified product path; and determining an optimum route for transporting material between selected ones of said plurality of workstations for said identified product path by an analysis of said selected attributes within said transport matrix and said desired path attribute.

5. The method in a computer based manufacturing system for controlling the transport of at least one material along a product path between selected ones of a plurality of work stations according to claim 4, wherein said step of listing selected attributes for each available method of transport comprises the step of listing a cost associated with each available method of transport.

6. The method in a computer based manufacturing system for controlling the transport of at least one material along a product path between selected ones of a plurality of work stations according to claim 4, wherein said step of listing selected attributes for each available method of transport comprises the step of listing a time delay associated with each available method of transport.

7. The method in a computer based manufacturing system for controlling the transport of at least one material along a product path between selected ones of a plurality of work stations according to claim 4, wherein said step of listing selected attributes for each available method of transport comprises the step of listing a capacity associated with each available method of transport.

* * * * *